(12) United States Patent
Rajeshwar et al.

(10) Patent No.: US 8,143,185 B2
(45) Date of Patent: Mar. 27, 2012

(54) PHOTOCATALYTIC DEPOSITION OF METALS AND COMPOSITIONS COMPRISING THE SAME

(75) Inventors: Krishnan Rajeshwar, Arlington, TX (US); Norma Tacconi, Arlington, TX (US); Chakkankal R. Chenthamarakshan, Corsicana, TX (US); Wesley Wampler, Weatherford, TX (US); Thomas F. Carlson, Azle, TX (US); Wen-Yuan Lin, Arlington, TX (US)

(73) Assignees: Board of Regents, The University of Texas System, Austin, TX (US); Sid Richardson carbon & Energy Co., Ft. Worth, TX (US)

( * ) Notice: Subject to any disclaimer, the term of this patent is extended or adjusted under 35 U.S.C. 154(b) by 305 days.

(21) Appl. No.: 12/055,867

(22) Filed: Mar. 26, 2008

(65) Prior Publication Data

US 2008/0241640 A1    Oct. 2, 2008

Related U.S. Application Data

(60) Provisional application No. 60/920,058, filed on Mar. 26, 2007.

(51) Int. Cl.
*B01J 21/00* (2006.01)
*B01J 23/00* (2006.01)
*B01J 25/00* (2006.01)
*B01J 29/00* (2006.01)
*B01J 21/18* (2006.01)
*B01J 27/20* (2006.01)
*B01J 27/06* (2006.01)
*B01J 23/40* (2006.01)
*B01J 23/74* (2006.01)

(52) U.S. Cl. ........ 502/185; 502/100; 502/174; 502/180; 502/181

(58) Field of Classification Search ............ 502/185, 502/100, 174, 180, 181
See application file for complete search history.

(56) References Cited

U.S. PATENT DOCUMENTS

2005/0153198 A1* 7/2005 Suzuki et al. ............ 429/128
2008/0213632 A1* 9/2008 Noguera et al. ............ 429/2

OTHER PUBLICATIONS

Shukla et al., "Methanol electrooxidation on carbon-supported Pt-WO3-x electrodes in sulphuric acid electrolyte", J. Appl Electrochemistry, 25:528-532 (1995).
Savadogo et al., "Five Percent Platinum-Tungsten Oxide-Based Electrocatalysts for Phosphoric Acid Fuel Cell Cathodes", J. Electrochem Soc, 143(12):3842-3846 (Dec. 1996).
Trogadas et al., "Pt/C/MnO2 hybrid electrocatalysts for degradation mitigation in polymer electrolyte fuel cells", J Power Sources, 174:159-163 (2007).
Shim et al., "Electrochemical characteristics of Pt-WO3/C and Pt-TiO2/C electrocatalysts in a polymer electrolyte fuel cell", J Power Sources 102:172-177 (2001).
Xiong et al, "Synthesis and characterization of methanol tolerant Pt/TiOx/C nanocomposites for oxygen reduction in direct methanol fuel Cells", Electrochimica Acta 49:4163-4170 (2004).
Kulesza et al., "Tungsten Oxides as Active Supports for Highly Dispersed Platinum Microcenters: Electrocatalytic Reactivity Toward Reduction of Hydrogen Peroxide and Oxygen", J Electrochem Soc, 144(6):1911-1917 (Jun. 1997).

* cited by examiner

*Primary Examiner* — James McDonough
(74) *Attorney, Agent, or Firm* — Parks IP Law LLC; Collen A. Beard, Esq.

(57) ABSTRACT

A photocatalytic metal deposition process and a resulting nanocomposite are described. The nanocomposite includes an electrically conducting carbonaceous material, a photoactive metal oxide and a metal. Metals for deposition include noble metals, metal alloys and other transition metals in which the metal is laid down precisely and in a predetermined fashion on one or more surfaces of a composite. Deposition provides a high performance electrocatalyst for a number of suitable applications.

20 Claims, 5 Drawing Sheets

US 8,143,185 B2

PHOTOCATALYTIC DEPOSITION OF METALS AND COMPOSITIONS COMPRISING THE SAME

CROSS-REFERENCES TO RELATED APPLICATIONS

This application claims the benefit of U.S. Provisional Application No. 60/920,058 filed Mar. 26, 2007.

BACKGROUND OF THE INVENTION

The described invention relates generally to the field of electrochemistry, and more specifically to a photocatalytic process for deposition and compositions formed therefrom.

Generally, one or more metals, particularly noble metals (e.g., platinum, palladium, gold) have been used as an electrocatalyst to speed up electrochemical processes, such as oxygen reduction in a fuel cell. In such electrocatalytic applications, it is exceedingly important that the metal be present in a finely dispersed form, often as nano-sized particles or nanoparticles. This is because catalytic activity of the metal is critically linked to particle size of the catalyst. From an economic perspective, it has become necessary to optimize the amount of metal used since many metals are quite expensive and may constitute a large share of the overall cost of a system requiring the electrocatalyst (e.g., fuel cell). Such optimization is still difficult, particularly minimizing catalyst loading without sacrificing electrocatalytic activity.

Typically, deposition of an electrocatalyst on a support is performed by a chemical or thermal reduction process, which is both wasteful and non-selective. Chemical reduction processes introduce new (and extraneous) chemicals (e.g., reducing agents) and also suffer from a lack of spatial selectivity such that the deposition occurs not only on a portion of the required surface but also in the material bulk where it is not used for the catalysis step. This constitutes a source of waste of the precious metal.

SUMMARY OF THE INVENTION

As described is that which solves one or more problems as identified above and offers a cost effective solution to a system requiring an electrocatalyst.

Generally, described herein is an electrocatalyst composition and a method of forming the composition provided by a photocatalytic deposition process of a metal, such as transition metal, noble metal or metal alloy, on a composite. The composite comprises a electrically conducting carbonaceous material and a photoactive metal oxide. Metal deposition is laid down precisely and in a predetermined fashion forming a nanocomposite, such that metal is deposited where desired (e.g., on one or more exterior surfaces of the composite substrate). The deposition process affords a high performance electrocatalyst in the form of a nanocomposite. The nanocomposite includes an oxide of metal, and a noble or transition metal or metal alloy and an electrically conducting carbon source. Such an electrocatalyst may be further provided with any of a number of suitable supports, such as a fuel cell, wherein the electrocatalyst is provided with an anode or cathode of a membrane electrode assembly.

Those skilled in the art will further appreciate the above-noted features and advantages of that described herein together with other important aspects thereof upon reading the detailed description that follows in conjunction with the drawings.

BRIEF DESCRIPTION OF THE DRAWINGS

For more complete understanding of the features and advantages of the present invention, reference is now made to the detailed description of the invention along with the accompanying figures, wherein.

DETAILED DESCRIPTION OF THE INVENTION

Figure 1:
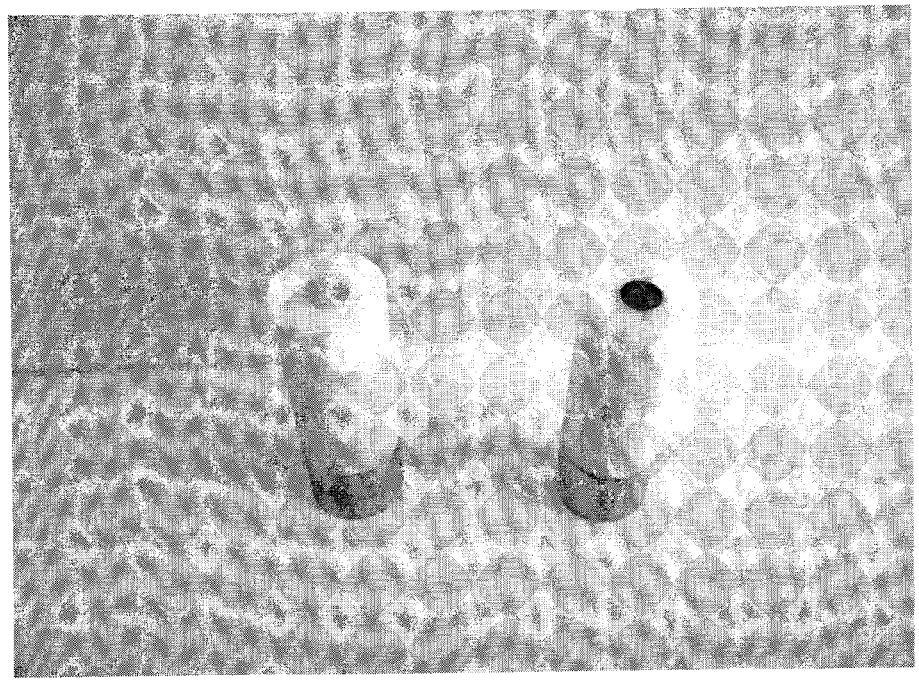
FIG. 1 depicts a representative example of a metal disc electrode before (left) and after (right) surfacing with an electrocatalyst.

Although making and using various embodiments of the present invention are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts may be marked throughout the specification and drawing with the same reference numerals or abbreviations. The drawing figures are not necessarily to scale and certain features may be shown exaggerated in scale or in somewhat generalized or schematic form in the interest of clarity and conciseness.

As described herein, a substrate comprising a nanocomposite promotes electrocatalysis. The nanocomposite is provided by photocatalytic deposition in a predetermined and pre-selected fashion on a support. In one or more embodiments, the composite includes a metal oxide provided with a carbon source. The metal oxide may include titanium dioxide (herein, T or TiO$_2$), tungsten trioxide (WO$_3$), zinc oxide (ZnO) and similar such metal oxides, as examples. The carbon source may include any electrically conducting carbonaceous material, examples of which include carbon black, carbon paper, carbon cloth, carbon nanotubes, and the like.

In one or more embodiments, the composite includes titanium dioxide impregnated carbon black (herein, $C/TiO_2$). In additional embodiments, the composite includes tungsten trioxide impregnated carbon black ($C/WO_3$). In still other embodiments, the composite includes zinc oxide impregnated carbon black (C/ZnO). One of ordinary skill in the art will appreciate and understand that other photoactive metal oxides (e.g., semiconductor metal oxides) and other conducting carbonaceous material are suitable for providing a composite as described herein.

Metals suitable for deposition as described herein are preferably noble metals, such as platinum, palladium and gold. In addition, other transition metals and metal alloys (e.g., cobalt-platinum) may be used. Further examples of transition metals include, but are not limited to, chromium, manganese, iron, cobalt, nickel copper, molybdenum, ruthenium, rhodium, silver, tungsten, as well as binary, ternary, and quaternary alloy and combinations thereof.

Because of the electrocatalytic composition, itself, and the method of deposition described herein, the amount of deposited metal is significantly lower than with other deposition processes and processes using other electrocatalytic compositions. As described herein, the activity of the metal and total amount of active metal deposited is increased. In addition, there is an increase in the amount of active metal surface on the catalyst in view of the manner and nature of the deposition. Thus, while the actual deposited amount of metal is less, there is a high conservation of the actual metal combined with a highly efficient deposition of the metal, which is generally only where desired. In many embodiments, the amount of deposited metal is less than about 20%. In other embodiments, the amount of deposited metal is about 5% or less.

Metal deposition is preferentially on the surface of the composite. The composite may be a composite as previously described, such as $C/TiO_2$, or any such similar material. An electrocatalyst source may generally include an electrically conducting carbonaceous material, photoactive metal oxides and a metal (e.g., transition metal or metal alloy) when combined as described herein. In one or more embodiments, an electrocatalyst source includes carbon black, platinum and titanium dioxide.

Examples described with this invention provide various embodiments of the electrocatalyst composition and method of deposition. In one example, a catalyst ink was prepared by mixing a powder comprising carbon, titanium dioxide and platinum with a solution of a sulfonated tetrafluorethylene copolymer (e.g., Nafion® from DuPont™) which was then coated on a Pt rotating disc electrode. The electrode was tested for performance [e.g., in an oxygen reduction reaction (ORR)]. The improved composition and method for metal deposition described herein provided superior performance for ORR against an alternative method for preparation and the resulting alternative composition. The improved electrocatalyst provided herein also exhibited a significant enhancement in ORR current density which was at least about 30% greater than that observed for a metal (e.g., Pt) coated carbon sample prepared by an alternative chemical method.

As described, an electrocatalyst, such as a Pt-modified carbon/$TiO_2$ electrocatalyst, is deposited on a substrate. When using Pt-modified carbon/$TiO_2$, $TiO_2$ was found to be predominantly in an anatase form. The $TiO_2$ had a specific surface area of approximately 60 $m^2/g$. Typically, carbon black and $TiO_2$ powder were mixed in preselected ratios and suspended in a precursor solution of potassium hexachloroplatinate at a desired concentration in a photoreactor that was irradiated with a 400 W medium pressure Hg lamp for 30 minutes. Three different carbon blacks, C1, C2, and C3 were sampled. Samples included carbon black from Cabot Corporation and Sid Richardson Carbon Co. Preselected ratios for C:$TiO_2$ included 60:40, 80:20, 90:10, and 95:5. It is understood that such ratios are merely representative and do not limit the pre-selected ratios that may be used.

Photocatalytic metal deposition and reactor design are explained in brief. Generally, for metal deposition, a $C/TiO_2$ suspension was dosed with a solution (containing a reaction medium of water with a metal salt) and an acid. For photocatalytic deposition of a Pt metal on a $C/TiO_2$ composite, a platinizing solution was used with a reaction medium of $K_2PtCl_6$ which was dosed with 5% formic acid. The suspension was irradiated with a 400 W UV lamp with agitation and flowing nitrogen for about 30 minutes followed by filtering of the suspension, washing with deionized water and drying at an elevated temperature (e.g., about 70 degrees Centigrade) for about 12 hours. For photoreaction, an immersion well design was employed with a double-walled quartz jacket for lamp cooling. The light source was typically a medium pressure mercury arc lamp with 400 W output. As is understood to one of ordinary skill in the relevant art, additional and suitable radiation sources and optical methods for delivering photons (e.g., fiber optic probes) may also be used. The nominal photon flux inside the photoreactor was estimated by ferrioxalate actinometry. The $C/TiO_2$ suspensions were agitated by sparging with ultrapure nitrogen. Any inert gas may suitably be used.

For comparison, electrocatalysts of Pt-modified carbon black (Pt—C) were prepared by a chemical method in the absence of $TiO_2$ using a technique well-known to one of ordinary skill and provided herein only briefly. A sodium citrate solution in water was added to a near boiling suspension of carbon black containing $K_2PtCl_6$. The resulting suspension was boiled for 1 hour and magnetically stirred for 12 hours at room temperature. The Pt—C suspensions was then filtered, washed thoroughly with deionized distilled water several times, and dried overnight at 70 degrees Centigrade.

Electrocatalysts may be cast on a support, such as a disc electrode or any other suitable support. In one example, a disc electrode was a Pt-disc electrode that had a 0.196 $cm^2$ area as depicted on the left in FIG. 1. Generally, any method for casting an electrocatalyst film on a support or disc electrode for ORR may be used, as is known to one of ordinary skill in the art. In one example, a suspension of 0.4 mL Nafion® (DuPont™) with 0.4 mL water and 16 mg of a carbon catalyst (as a control) were ultrasonically mixed for 5 minutes to form a catalyst ink. An aliquot of about 10 $\mu L$ of the resulting catalyst ink was cast on a disk electrode. After drying at 70 degrees Centigrade for about 20 minutes, an electrocatalytic film was provided on the disk electrode as depicted on the right in FIG. 1.

ORR provided a measure for electrocatalyst performance. In brief, the process included using an $O_2$ saturated sulfuric acid solution (e.g., pH=1). A Pt coil electrode and a silver-silver chloride (Ag/AgCl) saturated potassium chloride (KCl) electrode were used as counter and reference electrodes, respectively. A 1500 rpm rotation speed was used and current vs. potential plots were recorded on an electrochemical analyzer connected to a high performance rotator.

Figure 2:
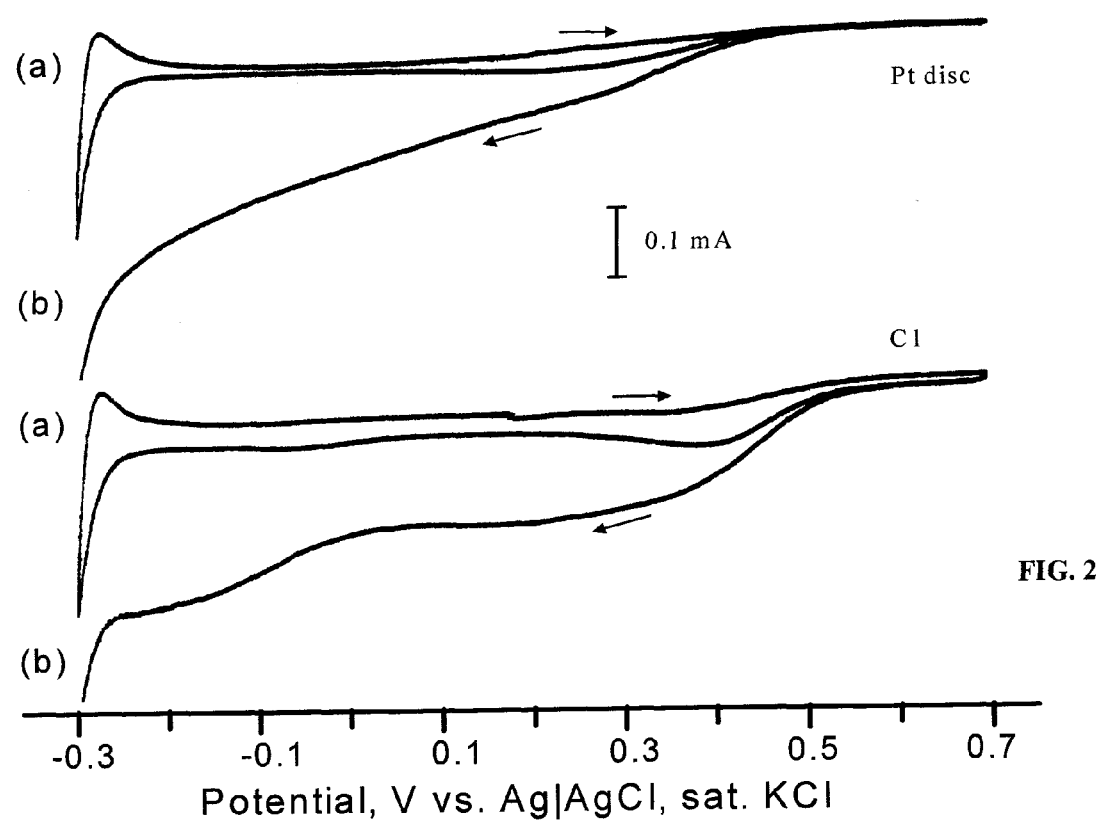
FIG. 2 depicts representative voltammograms of a pure metal electrocatalyst [top curves (a) and (b)] and a carbon-coated electrocatalyst [bottom curves (a) and (b)], where (a) is at 0 rpm and (b) is at 1500 rpm, each performed in an $O_2$-saturated sulfuric acid (pH=1) electrolyte at room temperature with a scan rate of 10 mV s$^{-1}$.

Rotating disc electrode measurements of $O_2$ reduction reaction were performed and provided a behavior of a control electrocatalyst as compared with a pure Pt disc electrode. Depicted in FIG. 2 are representative rotating disc electrode voltammograms of a pure Pt disc (top, a and b) and a control or carbon coated Pt disc (bottom; C1, a and b) with a rotation at 0 rpm (lines a) and 1500 rpm (lines b) and a sweep (scan) rate of 10 mV/sec. FIG. 2 further shows that activity of both electrodes towards ORR was low and comparable. The C1 curves showed a shift in the onset of $O_2$ reduction potential towards a positive potential indicating only a slightly higher catalytic activity for the reduction of oxygen on C1 as compared with a pure Pt disc.

Figure 3:
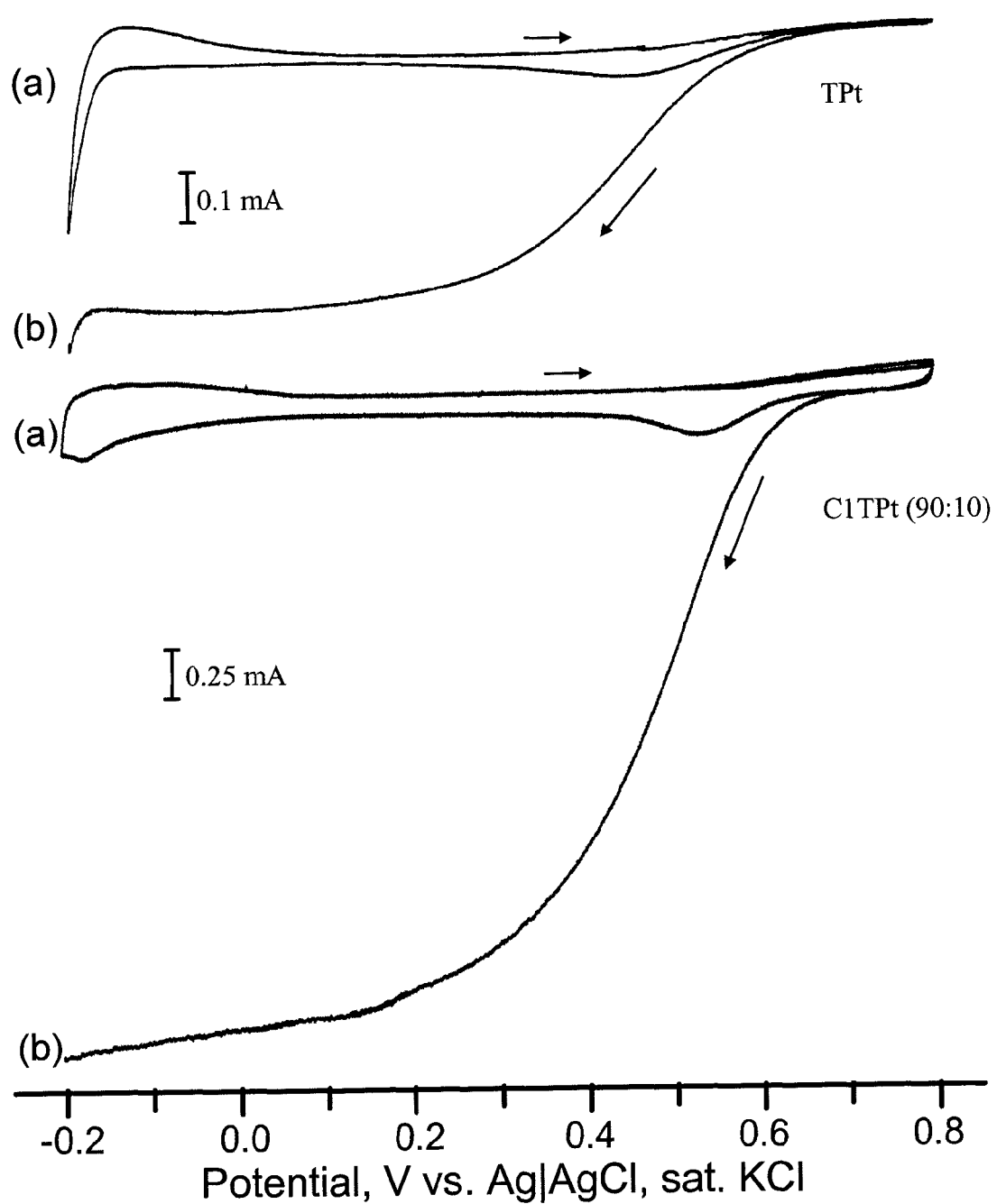
FIG. 3 depicts representative voltammograms of a titanium dioxide-metal electrocatalyst (TPt) and a platinum-modified titanium dioxide impregnated carbon black electrocatalyst (C1TPt), where (a) is at 0 rpm and (b) is at 1500 rpm, both performed in an $O_2$-saturated sulfuric acid (pH=1) electrolyte at room temperature with a scan rate of 10 mV s$^{-1}$.

Depicted in FIG. 3 are voltammograms of Pt-modified $TiO_2$ (top; TPt) and Pt-modified $C/TiO_2$ described herein (bottom; C1TPt). FIG. 3 shows that Pt metal was photocatalytically deposited on $TiO_2$ which was coated on the disc supports. Voltammograms in FIG. 3 further show better electrocatalytic behavior for ORR of these discs as compared with those represented in FIG. 2. Moreover, Pt-modified $C/TiO_2$ provided superior performance with a significant enhancement in ORR current density as compared with any of the other examples. This was, in part, from an improved nanoparticle distribution of the metal (i.e., Pt) on the composite substrate described herein (e.g., $C/TiO_2$) as compared with much less nanoparticle distribution when relying on the alternative modification (e.g., Pt-modified $TiO_2$).

Figure 4B:
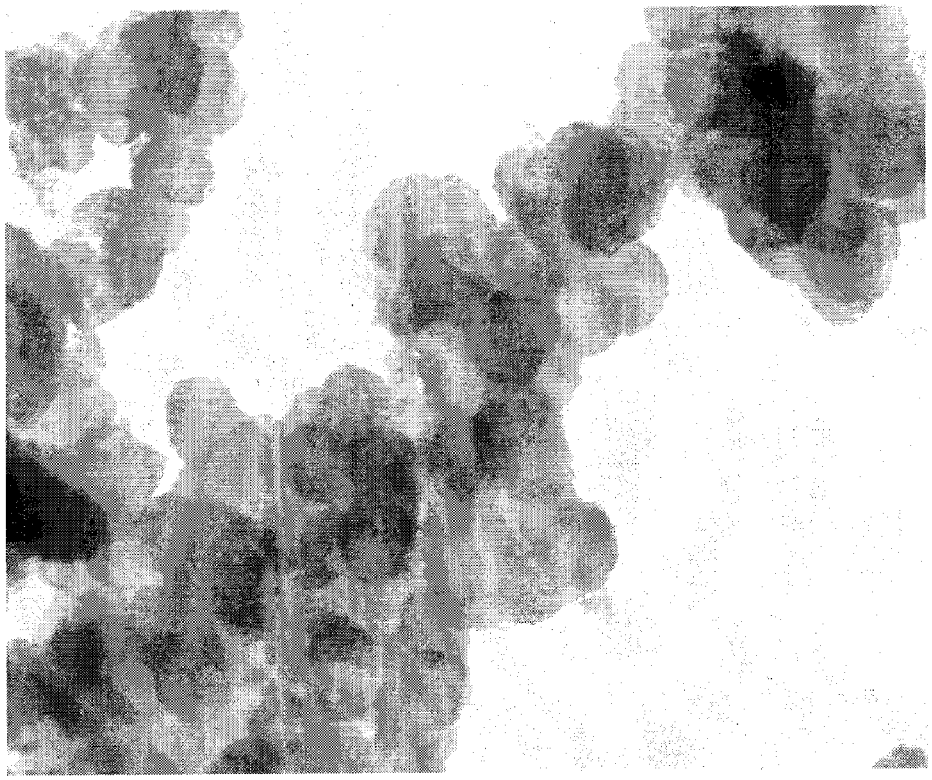
FIG. 4B depicts a TEM image of a platinum-modified carbon electrocatalyst prepared by an alternative method of chemical reduction.
Figure 4A:
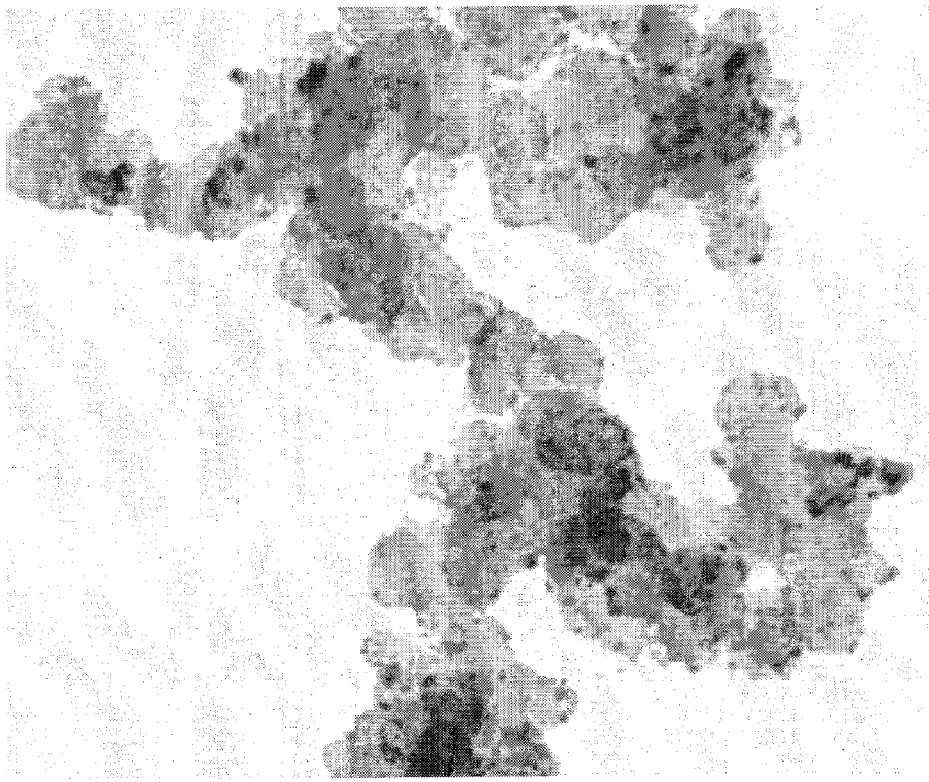
FIG. 4A depicts a representative transmission electron microscope (TEM) image of platinum (Pt) nanoparticles following photocatalytic deposition on a carbon-titanium composite substrate as described herein.

A representative image of the distribution of Pt particles on a composite substrate (in which $C:TiO_2$ was at a ratio of 90:10) is shown in FIG. 4A. Low magnification shows the spread and extensive distribution of Pt particles that are on the support. This is contrasted with FIG. 4B illustrating the particle distribution using the alternative method of preparing a Pt-modified carbon (C1Pt) electrocatalyst by chemical reduction. The darker regions in both FIGS. 4A and 4B represent the noble metal, platinum. It is unequivocally clear from these images that there is a superior dispersion of noble metal catalyst particles when a metal oxide is present in co-existence with carbon on the composite substrate provided by the method described herein (FIG. 4A).

Figure 5:
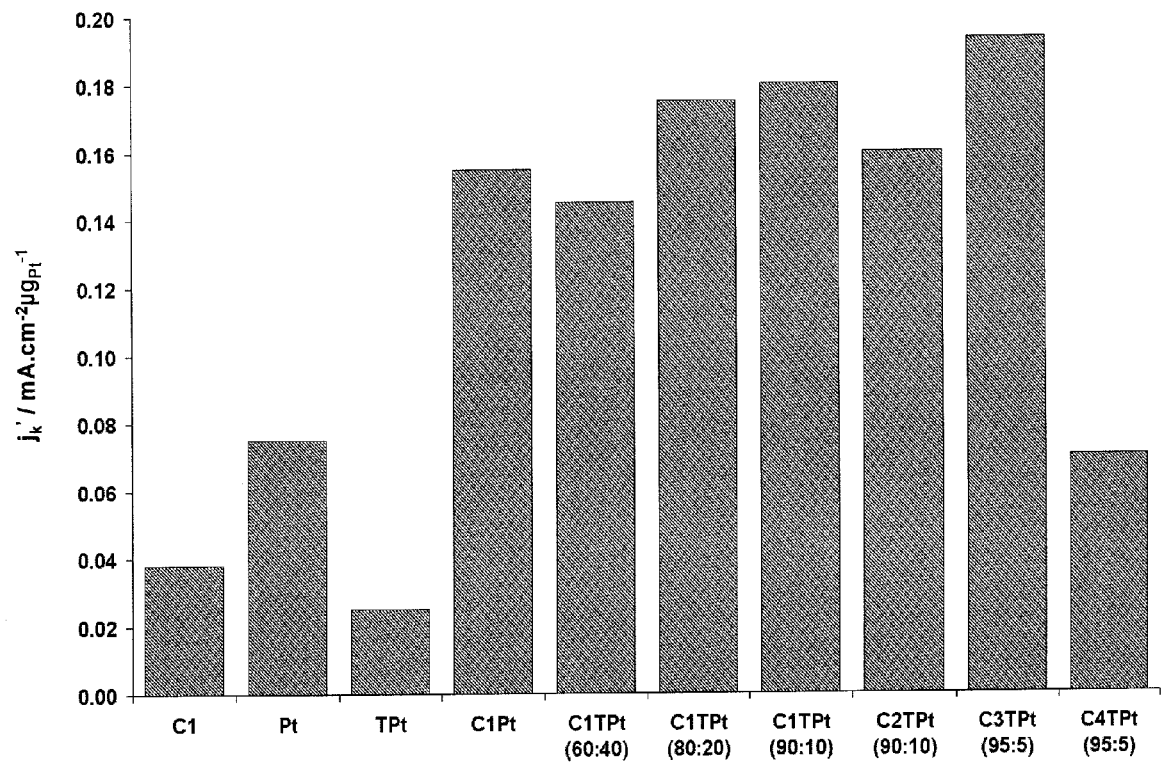
FIG. 5 depicts a comparative bar diagram of oxygen reduction reaction (ORR) kinetic current densities for selected metal-modified carbon and carbon-titanium dioxide composite supports (C1TPt, C2TPt, C3TPt and C4TPt) described herein, wherein C1 is a carbon-coated platinum (Pt) disk, Pt is a pure Pt disk, TPt is a Pt-modified TiO$_2$-coated Pt disk, wherein C1 to C4 represent different carbon types and/or sources.

Referring now to FIG. 5 is a diagram of ORR current densities for various Pt-modified C as compared with $C/TiO_2$ composites. Control or reference samples were used and included pristine carbon (C1), Pt and Pt-modified $TiO_2$ (TPt). All reference materials (C1, Pt, TPt) performed very poorly as compared with the nanocomposites described herein, including Pt-modified $C/TiO_2$ composite electrocatalysts (C1TPt, C2TPt, C3TPt, C4TPt) which were found to markedly outperform Pt-modified carbon black composites (C1Pt). Pt content was fixed at about 5% in all samples. Four ratios of carbon black to $TiO_2$ were used, including 60:40, 80:20, 90:10 and 95:5. Four types of carbon were used; one (C4TPt) was provided in the form of carbon nanotubes.

For the composites described herein, those having less $TiO_2$ (e.g., less $TiO_2$ to carbon) were found to typically perform better. The $TiO_2$ may be less than about 40%, less than 20%, and often less than 10%.

As depicted in FIG. 5, performance was improved with composites described herein, in which the improved composites herein provide a significant enhancement in ORR current density. In the example of FIG. 5, the improvement was at least about 30%. $TiO_2$ addition to carbon and acting as a catalyst appears to provide a base for improved photocatalytic deposition of Pt nanoparticles. With the addition of $TiO_2$ or its equivalents a composite surface described herein has an improved surface that serves as a source for uniform distribution of Pt particles. Moreover, such additions (e.g., $TiO_2$, $C/WO_3$, $C/ZnO$, as examples) are generally considered environmentally friendly and non-toxic materials, are durable and offer other advantageous electrochemical properties.

Figure 6:
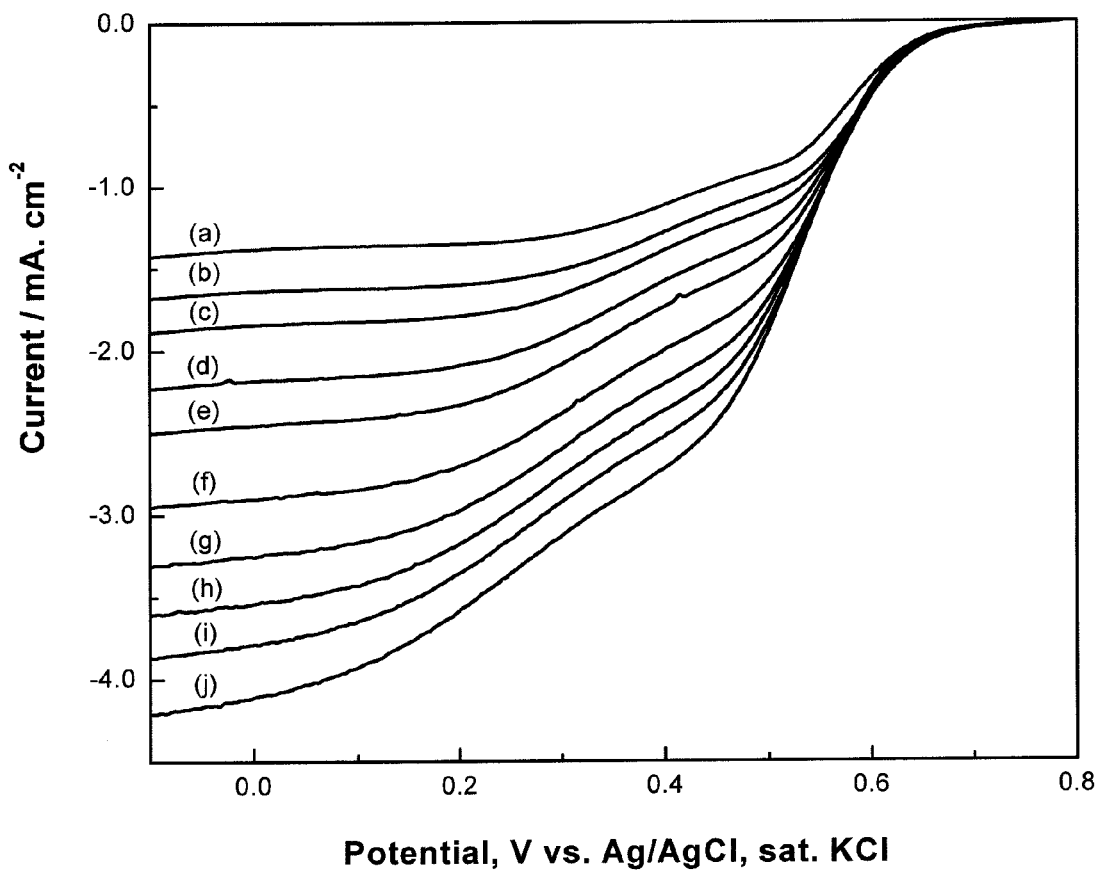
FIG. 6 depicts various rotation rates on oxygen reduction current densities for an electrocatalyst comprising a metal modified carbon-tungston trioxide composite, wherein the sweep rate was 10 mV/s and rotation rates were (a) 100, (b) 150, (c) 200, (d) 300, (e) 400, (f) 600, (g) 800, (h) 1000, (i) 1200 or (j) 1500 rpm.

The improved performance of electrocatalysts described herein is also depicted in FIG. 6, which shows behavior of an electrocatalyst comprising 5% Pt deposited photocatalytically on a 10% tungsten trioxide ($WO_3$) impregnated carbon black. The figure depicts various rotation rates on the oxygen reduction current densities for a thin-film of the electrocatalyst on a support electrode provided as a glassy carbon disk with a geometric area of 0.196 cm. All readings were performed in an $O_2$-saturated solution of 0.1 M $HClO_4$.

Improved electrocatalysts as described herein are further provided with an anode or cathode of a membrane electrode assembly in a single fuel cell, such as a polymer electrolyte membrane fuel cell or proton exchange membrane fuel cell. The electrocatalyst as described herein may be provided in a single fuel cell or in a number of such fuel cells that may be joined in a fuel cell stack. The catalyst described herein is used in an anode or cathode of membrane electrode assembly. As is known to one of ordinary skill in the art, the more fuel cells, the greater the power provided therein. The electrocatalyst will not effect or have an effect on the fuel source and any type of fuel typically used with a fuel cell or fuel cell stack may then be applied (e.g., pure hydrogen, hydrogen-mixture, methanol, ethanol, or a reformation of these or other useful chemicals, such as natural gas, methane, ethane, as well as higher hydrocarbons).

In one or more embodiments, a metal oxide impregnated with an electrically conducting carbon source facilitated metal photocatalytic deposition in a finely dispersed fashion. Because photocatalysis is surface specific, deposition of the metal was preferentially on the surface of the metal oxide impregnated carbon composite. The selected nanocomposite also increased the amount of active metal surface on the electrocatalyst. Accordingly, the catalytic activity of the electrocatalyst provided herein is much improved over those prepared by alternative methods or made of alternative compositions. The small, nano-sized particles provided in a highly dispersed fashion on the surface of a composite described herein ensures superior activity of electrocatalysts prepared as described herein.

The very small particle size of the deposited metal, the manner of particle dispersion, and method of deposition together make an electrocatalyst fabricated as described herein more economical and more efficient; fabrication is at a lower cost when there is a lower amount of metal required to make electrocatalysts as described herein. In addition, the actual content of the deposited metal in the cathode electrocatalyst was lower than in alternative electrocatalysts that are prepared by other alternative methods, including chemical deposition that typically contain as much as 60% metal. As described herein, the deposited metal content in the described electrocatalyst was about 5% by mass. Deposition, moreover, was found to be capable of selective modification, as desired, and metal loading has been found to be in a range from about 1% to about 60%.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. An electrocatalytic composition comprising an electrically conducting carbonaceous material, a photoactive metal oxide, and a metal, wherein the carbonaceous material and the photoactive metal oxide form a first composite and the metal is deposited on the first composite by photocatalysis, and wherein the electrocatalytic composition is characterized by an increase in deposited active metal and superior dispersion of metal compared to electrocatalytic compositions not formed by photocatalysis.

2. The electrocatalytic composition of claim 1, wherein the electrically conducting carbonaceous material includes a carbon source selected from the group consisting of carbon black, carbon paper, carbon cloth, and carbon nanotubes.

3. The electrocatalytic composition of claim 1, wherein the metal is selected from the group consisting of transition metals, noble metals, metal alloys, and combinations thereof.

4. The electrocatalytic composition of claim 1, wherein the metal is platinum.

5. The electrocatalytic composition of claim 1, wherein the photoactive metal oxide is a semiconductor metal oxide.

6. The electrocatalytic composition of claim 1, wherein the photoactive metal oxide is titanium dioxide.

7. The electrocatalytic composition of claim 1, wherein the deposited metal is in the form of nanoparticles.

8. The electrocatalytic composition of claim 1, wherein the amount of metal oxide in the first composite is from about 5 to 10%.

9. The electrocatalytic composition of claim 1, wherein the first composite is titanium dioxide impregnated carbon black.

10. The electrocatalytic composition of claim 1, wherein the amount of metal deposited on the first composite is less than about 50%.

11. The electrocatalytic composition of claim 1, wherein the amount of metal deposited on the first composite is less than about 5%.

12. A method of making an electrocatalytic composition using photocatalysis, comprising the steps of combining an electrically conductive carbonaceous material and a photoactive metal oxide to form a first composite, placing the composite and a metal ion precursor in a photoreactor, and irradiating the composite and metal ion precursor so that the metal deposits on the composite.

13. The method of claim 12 further comprising the step of collecting and washing the electrolytic composition.

14. The method of claim 12, wherein the step of combining the carbonaceous material and metal oxide is done with sonication.

15. The method of claim 12, wherein the step of combining the carbonaceous material and metal oxide results in a metal oxide impregnated carbonaceous material.

16. The method of claim 12, wherein the electrically conducting carbonaceous material includes a carbon source selected from the group consisting of carbon black, carbon paper, carbon cloth, and carbon nanotubes.

17. The method of claim 12, wherein the metal is selected from the group consisting of transition metals, noble metals, metal alloys, and combinations thereof.

18. The method of claim 12, wherein the photoactive metal oxide is a semiconductor metal oxide.

19. The method of claim 12, wherein the carbonaceous material is carbon black, the metal oxide is titanium dioxide, and the metal is platinum.

20. A method of making an electrocatalytic composition comprising an electrically conducting carbonaceous material, a photoactive metal oxide, and a metal comprising the steps of forming a metal oxide impregnated carbonaceous material from the carbonaceous material and the metal oxide and photocatalytically depositing the metal onto the metal oxide impregnated carbonaceous material.

* * * * *